United States Patent
Caputo, II et al.

(10) Patent No.: US 9,621,456 B2
(45) Date of Patent: *Apr. 11, 2017

(54) REDIRECTING NETWORK TRAFFIC BASED ON CONTENT

(71) Applicant: Level 3 Communications, LLC, Broomfield, CO (US)

(72) Inventors: Pete J. Caputo, II, Highlands Ranch, CO (US); William Thomas Sella, Parker, CO (US)

(73) Assignee: Level 3 Communications, LLC, Broomfield, CO (US)

(*) Notice: Subject to any disclaimer, the term of this patent is extended or adjusted under 35 U.S.C. 154(b) by 278 days.

This patent is subject to a terminal disclaimer.

(21) Appl. No.: 14/258,894

(22) Filed: Apr. 22, 2014

(65) Prior Publication Data
US 2015/0098465 A1    Apr. 9, 2015

Related U.S. Application Data

(63) Continuation of application No. 14/047,523, filed on Oct. 7, 2013, now Pat. No. 8,724,626.

(51) Int. Cl.
| H04L 12/28 | (2006.01) |
| H04L 12/723 | (2013.01) |
| H04L 12/721 | (2013.01) |
| H04L 12/743 | (2013.01) |
| H04L 12/747 | (2013.01) |
| H04J 1/16 | (2006.01) |

(52) U.S. Cl.
CPC .......... *H04L 45/507* (2013.01); *H04L 45/50* (2013.01); *H04L 45/66* (2013.01); *H04L 45/742* (2013.01); *H04L 45/7453* (2013.01)

(58) Field of Classification Search
USPC ........ 370/252, 238, 239, 389; 709/240, 241, 709/242
See application file for complete search history.

(56) References Cited

U.S. PATENT DOCUMENTS

| 5,101,402 | A | 3/1992 | Chiu et al. |
| 6,412,000 | B1 | 6/2002 | Riddle et al. |
| 6,473,421 | B1 * | 10/2002 | Tappan ................... H04L 45/04 370/351 |
| 6,526,044 | B1 | 2/2003 | Cookmeyer, II et al. |
| 6,873,600 | B1 | 3/2005 | Duffield et al. |

(Continued)

OTHER PUBLICATIONS

International Search Report, dated Mar. 6, 2015, Int'l Appl. No. PCT/US14/053274, Int'l Filing Date Aug. 28, 2014; 5 pgs.

(Continued)

*Primary Examiner* — John Pezzlo (57) ABSTRACT

A rule indicates that data having particular characteristics be automatically routed to a particular destination. When software on a switching device detects a new data stream, it is analyzed to determine whether it has characteristics specified by the rule. If it does, the packet is encapsulated with a special tag, indicating that the packet should be routed to the new destination. Also, an entry is added to a quick-lookup table in the switching device. The entry indicates that future packets in the data stream that have the same source and destination port and address should also be routed to the new destination.

20 Claims, 7 Drawing Sheets

(56) References Cited

U.S. PATENT DOCUMENTS

| | | |
|---|---|---|
| 7,340,535 B1 | 3/2008 | Alam |
| 7,403,988 B1 | 7/2008 | Blouin et al. |
| 7,706,291 B2 | 4/2010 | Luft et al. |
| 7,773,536 B2 | 8/2010 | Lloyd et al. |
| 7,788,354 B2 | 8/2010 | Nag |
| 7,889,642 B2* | 2/2011 | Lu .................. H04L 45/02 370/228 |
| 7,940,676 B2 | 5/2011 | Griffin et al. |
| 7,970,930 B2 | 6/2011 | Dobbins et al. |
| 2009/0073977 A1 | 3/2009 | Hussain et al. |
| 2011/0142054 A1 | 6/2011 | Scholl et al. |
| 2011/0196971 A1 | 8/2011 | Reguraman et al. |
| 2012/0134497 A1 | 5/2012 | Roitshtein et al. |
| 2012/0300615 A1* | 11/2012 | Kempf .................. H04W 24/02 370/216 |
| 2013/0170435 A1* | 7/2013 | Dinan .................... H04L 45/50 370/328 |
| 2013/0308644 A1 | 11/2013 | Ferguson et al. |
| 2013/0343387 A1* | 12/2013 | Stroud .................... H04L 45/74 370/392 |
| 2013/0343390 A1* | 12/2013 | Moriarty ............. H04L 43/0852 370/392 |

OTHER PUBLICATIONS

Written Opinion of the International Searching Authority, dated Mar. 6, 2015, Int'l Appl. No. PCT/US14/053274, Int'l Filing Date Aug. 28, 2014; 9 pgs.

International Preliminary Report on Patentability, dated Apr. 12, 2016, Int'l Appl. No. PCT/US14/053274, Int'l Filing Date Aug. 28, 2014; 11.

European Examination Report, dated Feb. 3, 2017, Application No. 14762194.0, filed Aug. 28, 2014, 5 pgs.

\* cited by examiner

REDIRECTING NETWORK TRAFFIC BASED ON CONTENT

BACKGROUND

Field

This field is generally related to network routing.

Related Art

A communication network may, for example, provide a dedicated network connection that allows data to be transferred between two or more geographically remote locations. For example, an Ethernet network may provide an Ethernet E-line between those locations. While dedicated network connections may be advantageous in some respects, they may be limited in that they only allow for communication between those discrete, preidentified locations.

In addition to dedicated network connections, a communication network may also provide connectivity that is not necessarily dedicated. For example, traditional routing algorithms allow packets to be forwarded based on a destination address identified in a packet header. In this way, using the destination address, a packet can be routed to any destination in the network.

While routing data based on the destination address may be advantageous in many circumstances, it also limits the flexibility. In particular, a user may want to route the packet based on criteria other than destination address. Policy-based routing (PBR) provides the ability to route data based on other criteria, including source or destination port, protocol, packet size, and packet classification. However, configuring policy-based routing across a network may be cumbersome.

BRIEF SUMMARY

In an embodiment, a system routes traffic through a network including a plurality of interconnected switching devices. The system includes a redirect module that receives a packet that includes a header and contents, and determines that the packet is in a new data stream. A business rule module determines that a rule in a plurality of rules correlates to the contents of the packet and determines a destination for the packet based on the rule. A label deter module determines a label to attach to packet. The label indicates to the plurality of interconnected switching devices how to route data to the destination. The label is attached to respective packets in the new data stream to direct the data stream to the destination determined based on the rule and the contents.

Method and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

As mentioned above, Policy-Based Routing (PBR) provides the capability to route traffic based on certain criteria other than the destination address. However, configuring PBR across a network may be cumbersome. Embodiments involve applying a label to the packet based on content of the packet at a switching device, such as an access, aggregation, or core switching device. Then, downstream switching devices recognize the label and forward the packet based on the label to a destination.

The Detailed Description that follows is divided into three sections. The first section describes dedicated network connections with respect to FIG. 1. The second section describes redirecting traffic from the dedicated connections to a new destination with respect to FIG. 2, according to an embodiment. The third and final section describes the different examples of the redirection in greater detail with respect to FIGS. 3-7.

Dedicated Network Connections

Figure 1:
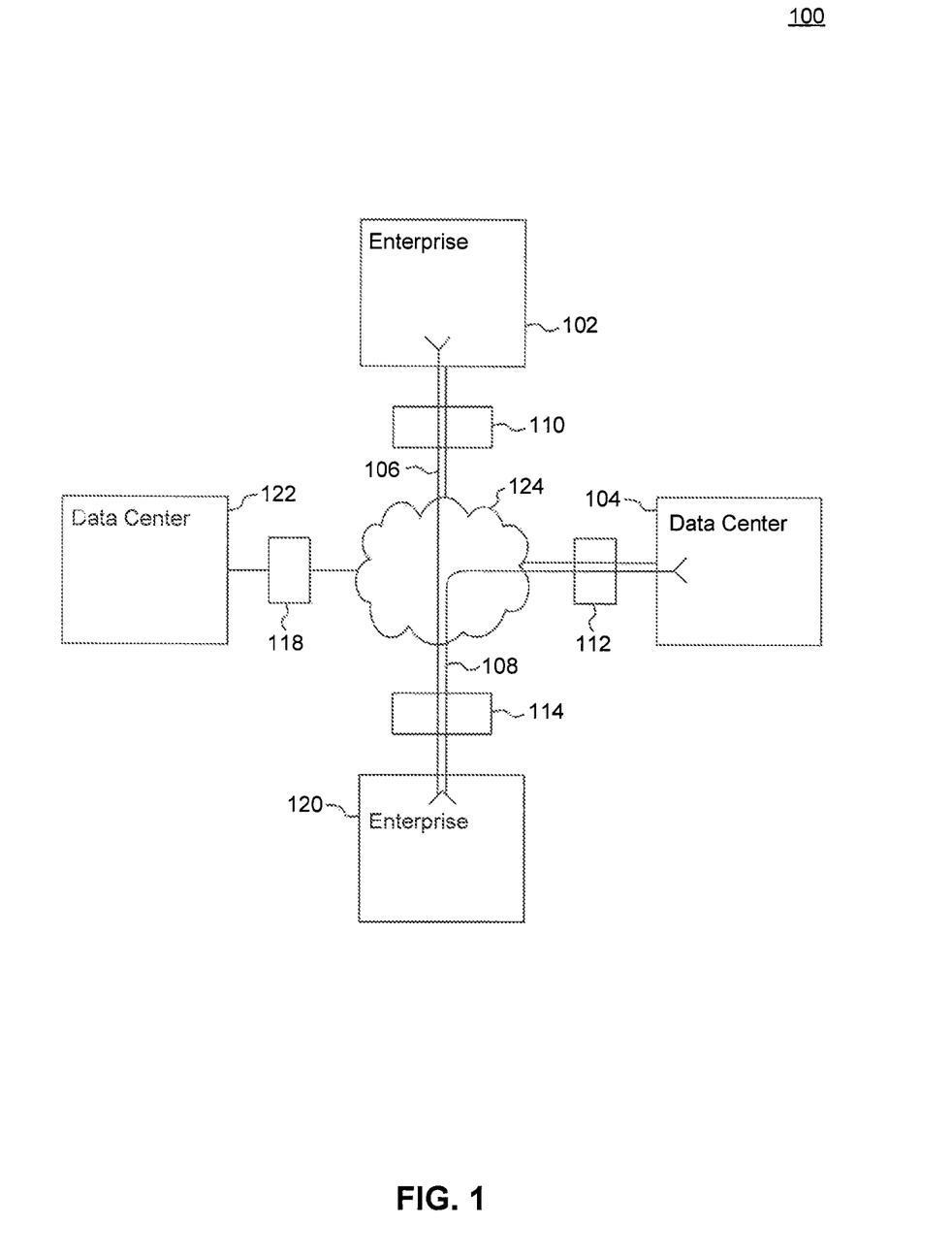
FIG. 1 shows an example network that provides dedicated network connections between different locations.

FIG. 1 shows a diagram 100 illustrating a network 124 that provides dedicated network connections between different locations. The network 124 may be a metropolitan area network (MAN) or wide area network (WAN). It may utilize any point-to-point, point to multipoint, or multipoint-to-multipoint networking protocols. Network access protocols used may include Ethernet, Asynchronous Transfer Mode (ATM), High-Level Data Link Control (HDLC), Frame Relay, Synchronous Optical Networking (SONET)/Synchronous Digital Hierarchy (SDH), Internet Protocol (IP), Transmission Control Protocol (TCP), User Datagram Protocol (UDP), or Multiprotocol Label Switching (MPLS).

Network 124 connects to various geographically remote locations. In particular, network 124 connects to two enterprises—enterprise 102 and enterprise 120—and two data centers data center 104 and data center 122. The enterprises may be organizational local area networks (LANs), such as Ethernet LANs, perhaps occupying a single building. The network data centers may be facilities used to house computer systems and associated components, such as telecommunications, servers, and storage systems. They may provide cloud services, such as infrastructure as a service and software as a service.

To connect to network 124, each location may utilize an access switching device. The access switching device may, for example, be located on the premises. In FIG. 1, enterprise 120 has an access switching device 114; enterprise 102 has an access switching device 110; data center 122 has an access switching device 118; and data center 104 has an access switching device 112. Connecting the access switching devices, network 124 may also have a plurality of switching devices interconnected by links (not shown). In different embodiments, the term "switching device" may refer to either a network switch or router.

To provide connectivity between the various remote locations, the user may request that dedicated network connections be provisioned across network 124. In particular, network 124 has a dedicated network connection 106 connecting enterprise 102 and enterprise 120, and a dedicated network connection 108 connecting enterprise 120 and data center 104.

A dedicated network connection is a connection with bandwidth reserved for a particular user. In other words, no other user of the network can have access to the bandwidth reserved for a particular user on a dedicated connection. Reserving bandwidth may involve associating a particular bandwidth with a user. While still reserving bandwidth, a network may be oversubscribed, meaning that if all users were using all their associated bandwidth, the network would have insufficient capacity. A dedicated network connection may be seen as a private connection to one user. Such a dedicated network connection may be point-to-point, in which the connection connects two points on the network. On the other hand, the connection may also be multipoint-to-multipoint, in which a set of one or more points on the network is connected to a second set of one or more network points. A switching device may receive traffic for a user on a particular port of an access switching device.

In an example, network 124 may be an Ethernet network, and dedicated network connections 106 and 108 may be Ethernet E-lines. E-Line, a data service defined by the Metro Ethernet Forum, provides a point-to-point Ethernet connection between a pair of user network interfaces.

While the dedicated network connections enable enterprise 120 to communicate with enterprise 102 and data center 104, in the example of FIG. 1, enterprise 120 may be unable to communicate with data center 122.

Embodiments enable enterprise 120 to communicate with data center 122, without having to provision a new dedicated network connection. In particular, embodiments take traffic on a traditional network flow, such as the dedicated network connection between enterprise 102 and data center 104, and redirect it to data center 122. In this way, embodiments enable communication with data center 122, without having to provision another dedicated network connection. This communication is illustrated, for example, with respect to FIG. 2.

Flow Vectoring

Figure 2:
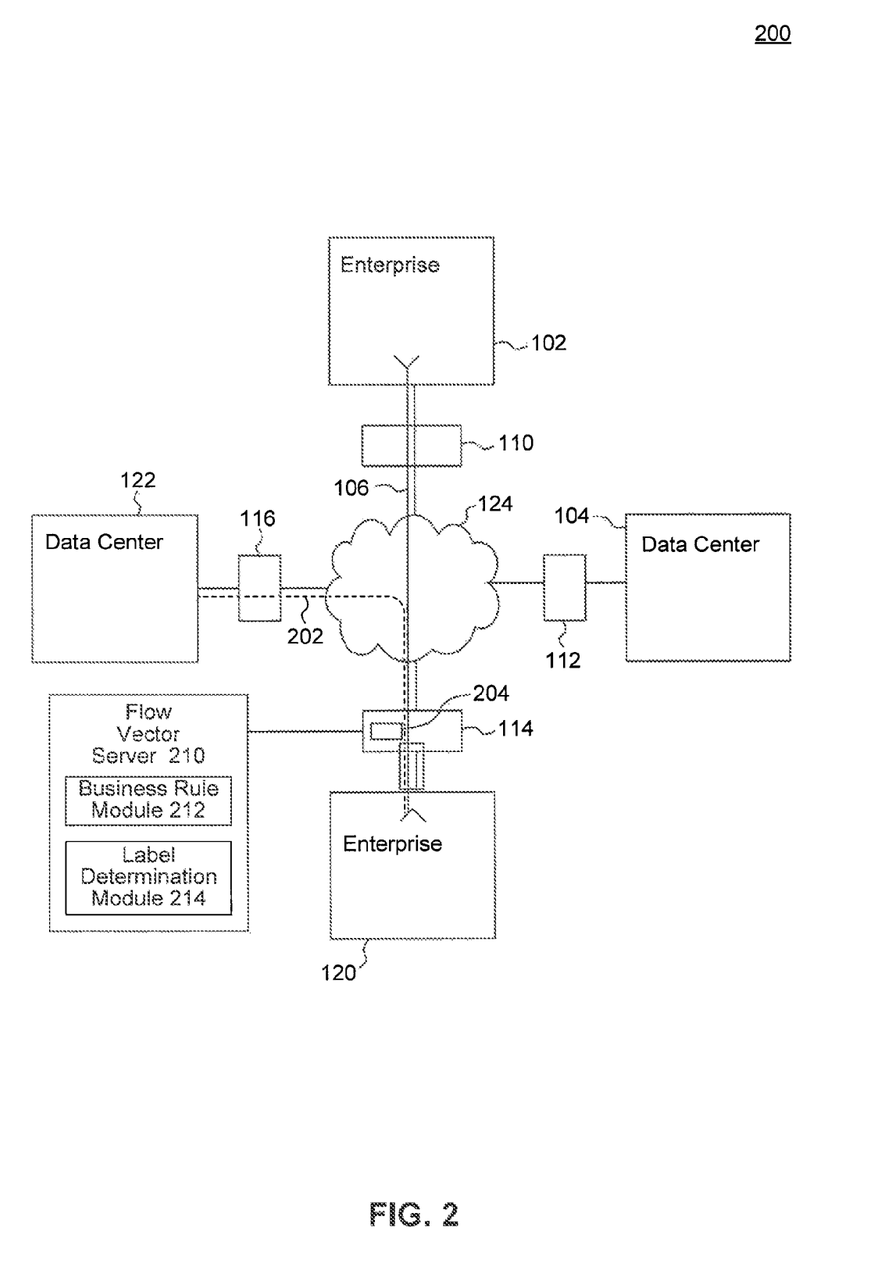
FIG. 2 illustrates a system that applies a label to redirect traffic based on content, according to an embodiment.

FIG. 2 shows a diagram 200, illustrating a system that applies a label to redirect traffic based on content through the network in FIG. 1, according to embodiment. In particular, traffic is redirected by a flow vector server 210, which includes a business rule module 212 and a label determination module 214.

In operation, access switch 114 has a specialized module 204 that detects a new data stream. When a packet from a new data stream is detected, the packet, including both its header and its contents, is forwarded to flow vector server 210.

At flow vector server 210, business rule module 212 analyzes the packet's contents to determine whether to redirect it. To make this determination, business rule module 212 may refer to a rule. In one embodiment, the rule may merely make content to a particular destination. In another embodiment, the user's service level agreement (SLA). The service level agreement specifies how the traffic may be handled. It may include guarantees with respect to different service levels, such as a guaranteed level of bandwidth, latency, or jitter. It may also specify business rules indicating that traffic having certain characteristics must be routed in a certain way. Based on this information, business rule module 212 determines a destination for the data stream. The destination may be selected from a plurality of possible destinations.

Once the destination is determined, label determination module 214 determines a label to apply to the packet. The label may indicate the particular destination or a path to the particular destination. The switching devices on network 124 may be configured to recognize the label and route packets having the label to the destination. In an example, the label may be a Multiprotocol Label Switching (MPLS) label. When the appropriate label is determined, label determination module 214 sends the label back to access switch 114.

When access switch 114 receives label, it may update its tables to recognize the packets in the data stream and attach the label to those packets. Because the labels are attached to those packets, switches on network 124 may route the packets to the destination determined by the flow vector server 210, regardless of their original destination address.

In an example operation, traffic generally is exchanged between enterprise 102 and enterprise 120 via dedicated network connection 106. However, a user may configure a business rule that identifies certain types of packets, for example packets utilizing Transport Control Protocol (TCP)/Internet Protocol (IP) and having particular source/destination addresses and ports. The business rule may also indicate that those packets should be routed to data center 122 and potentially further to a particular server or service within data center 122. When flow vector server 210 recognizes a packet having these attributes, flow vector server 210 updates the routing tables in access switch 114 to attach a label to all packets having those attributes.

As packets arrive with those user-specified addresses and ports, access switch 114 attaches the label and forwards the packets onto other switches in network 124. The other switches recognize the label and forward the packets to route them to data center 122 along a path 202. In this way, a data stream is taken off its normal flow across the dedicated network connection 106 and, in effect, given its own private connection to data center 122 just for that individual data stream. Packets in the stream may also be modified as part of the business rule. For example, the destination IP address of the packet may be modified from its original value to another IP address which is able to be easily routed to a destination in data center 122 without a need for extending the flow vector inside of data center 122 to the final destination server. Other modifications could include a change in the quality of service bits in the packet which may impact the queuing priority of the packet within the network 124.

Redirecting network traffic based on content in this way is described in greater detail with respect to additional examples in FIG. 3-7.

Additional Embodiments and Examples

Figure 3:
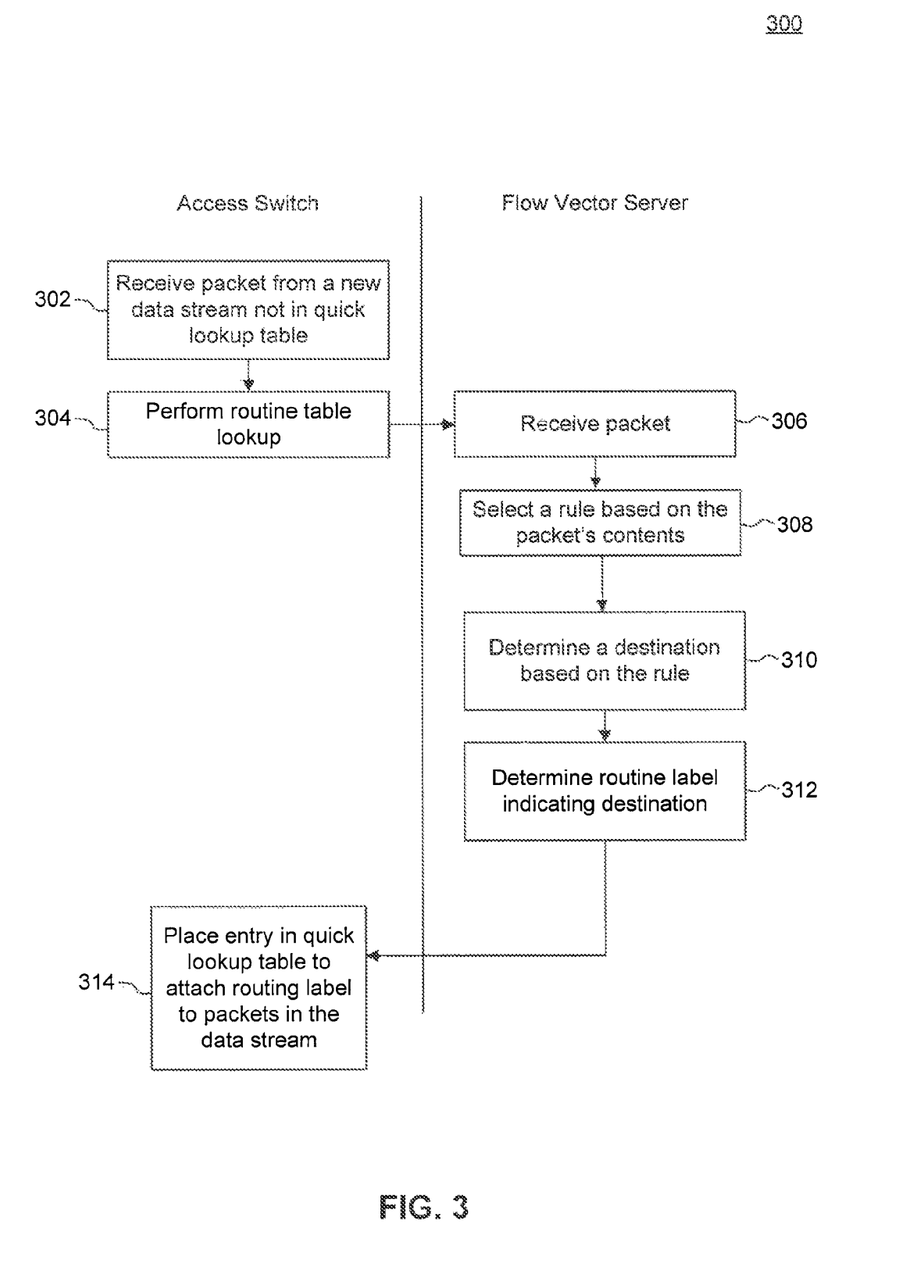
FIG. 3 illustrates a method for applying a label to redirect traffic based on content, according to an embodiment.

FIG. 3 illustrates a method 300 for applying a label to redirect traffic based on content, according to embodiment. The method 300 is described with respect to examples in FIGS. 4-7.

Method 300 begins at step 302, when a packet from a new data stream is received. The packet may be received at an access switching device. Access switching devices may have two different look up tables used to determine how to forward the packet. One lookup table may be a quick lookup table that directly maps specific header information to a port on the switching device. For example, the quick lookup table may map a hash of the destination address or other header information to a port. The quick lookup table may not have entries for every possible destination.

Another lookup table may be utilized to determine a particular port for any destination address. For example, the second lookup table may have entries for particular subnets. The subnets may define a particular port on which to forward packets given a prefix of the destination address. Determining how to forward packets using the second lookup table may take longer than using the quick lookup table. For that reason, the access switching device may first reference the faster, less complete lookup table and then, if no match is found, reference the slower, more complete lookup table. At step 302, when the received packet does not have an entry in the quick lookup table, the switching device may determine that the packet is part of a new data stream.

Step 302 may be executed by a flow matching module 606. Step 302 is described in greater detail with respect to FIGS. 4 and 5.

Figure 4:
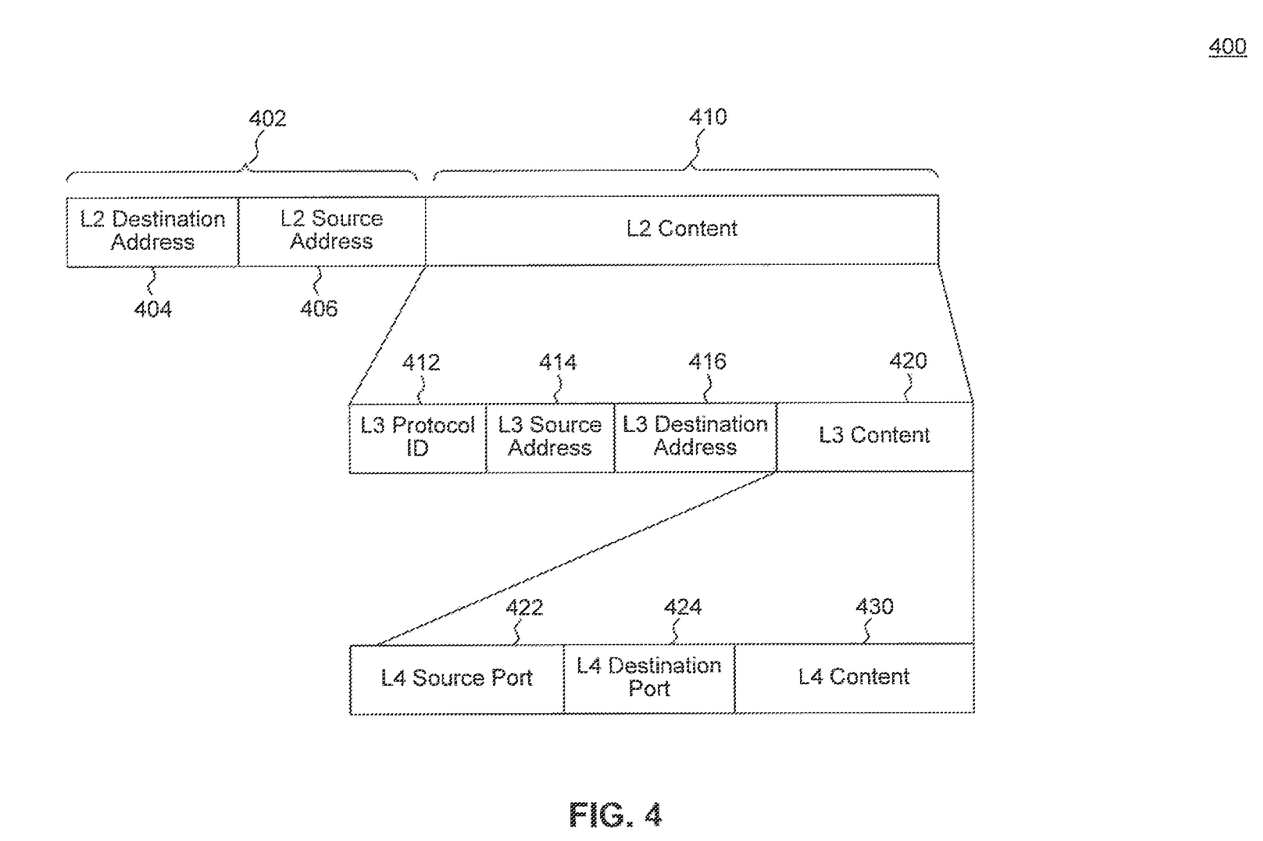
FIG. 4 illustrates a packet and its content.

FIG. 4 illustrates an example packet 400 and its content. In networking, a skilled artisan would recognize that protocols operate at different layers. For example, the Open Systems Interconnection (OSI) model specifies seven layers: (1) a physical layer may handle media, signal, and binary transmission; (2) a data link layer may handle physical addressing and may guarantee packets are delivered in order; (3) a network layer may handle logical addressing; (4) a transport layer may provide end-to-end connections, reliability, and flow control; (5) a session layer may control the dialogues (connections) between computers; (6) a presentation layer may establish context between application-layer entities; and (7) an application layer may transfer application data. An example level two, data link layer protocol may be Ethernet; an example level three, network layer protocol may be Internet Protocol (IP); and an example level four, transport layer protocol may be Transmission Control Protocol (TCP).

Layers 2-4 of packet 400 are illustrated in FIG. 4. At layer two, packet 400 has a header 402 and contents, or body, 410. Header 402 includes various fields, including a destination address 404 and source address 406. In an example, packet 400 may be an Ethernet packet, and addresses 404 and 406 may be media access control (MAC) addresses. The term "packet," as used herein, includes both packets and frames. Header 402 may include other fields not shown, including a start of frame delimiter, a length of the packet, and a checksum. While the header here is shown before content 410, a skilled artisan would recognize that they could be placed in other configurations as well.

At layer two, content 410 includes the layer three protocol data. In many embodiments, when packet 400 is a first packet in a data stream, content 410 includes layer three packet header information. As shown in FIG. 4, content 410 at layer two includes header fields at level three, including a protocol ID 412, a source address 414, and a destination address 416. Protocol ID 412 may indicate the type of layer three protocol being used. For example, when packet 400 carries IP data, protocol ID 412 may indicate that IP is being used. Further, protocol ID 412 may indicate the protocol used in layer 4 as well. For example, protocol ID 402 may indicate that layer 4 includes TCP data.

In the example where IP is used, source address 414 and destination address 416 may be source and destination IP addresses. The layer three header may have other fields not shown as well, such as the total length, the fragment offset, and a checksum. In addition to the header information, as mentioned above, at layer three, packet 400 includes content 420.

Content 420 includes the layer four data. In examples, the layer four protocol may be TCP or User Datagram Protocol (UP). The layer four data itself includes a header, which includes a source port 422 and a destination port 424, and content 430. Source port 422 may indicate a particular application on the source machine that sent content 430 and destination port 424 may indicate a particular application on the source machine to receive content 430. The layer four header may have other fields not shown as well, such as an acknowledgment number, a sequence number, and a checksum.

Content 430 may be the application layer data. In examples, the application layer data may be hypertext transfer protocol (HTTP), simple mail transfer protocol (SMTP), or file transfer protocol (FTP).

Referring to FIG. 3, in step 302, when a packet, such as packet 400 in FIG. 4, is received, it is evaluated against a quick lookup table to determine whether it is a new data stream. As mentioned above, the evaluation may be done by a flow matching module 606 illustrated in FIG. 6. If the match succeeds, flow matching module 606 may recognize that the packet is part of an existing data stream and may handle the match as specified in a quick lookup table. For example, it may forward the packet to a port on the switching device identified in the table, effectively making the next hop in the packet's transmission. If the match fails, flow matching module 606 may recognize that the packet is not part of an existing data stream, and may redirect the packet as illustrated in FIG. 5.

Figure 5:
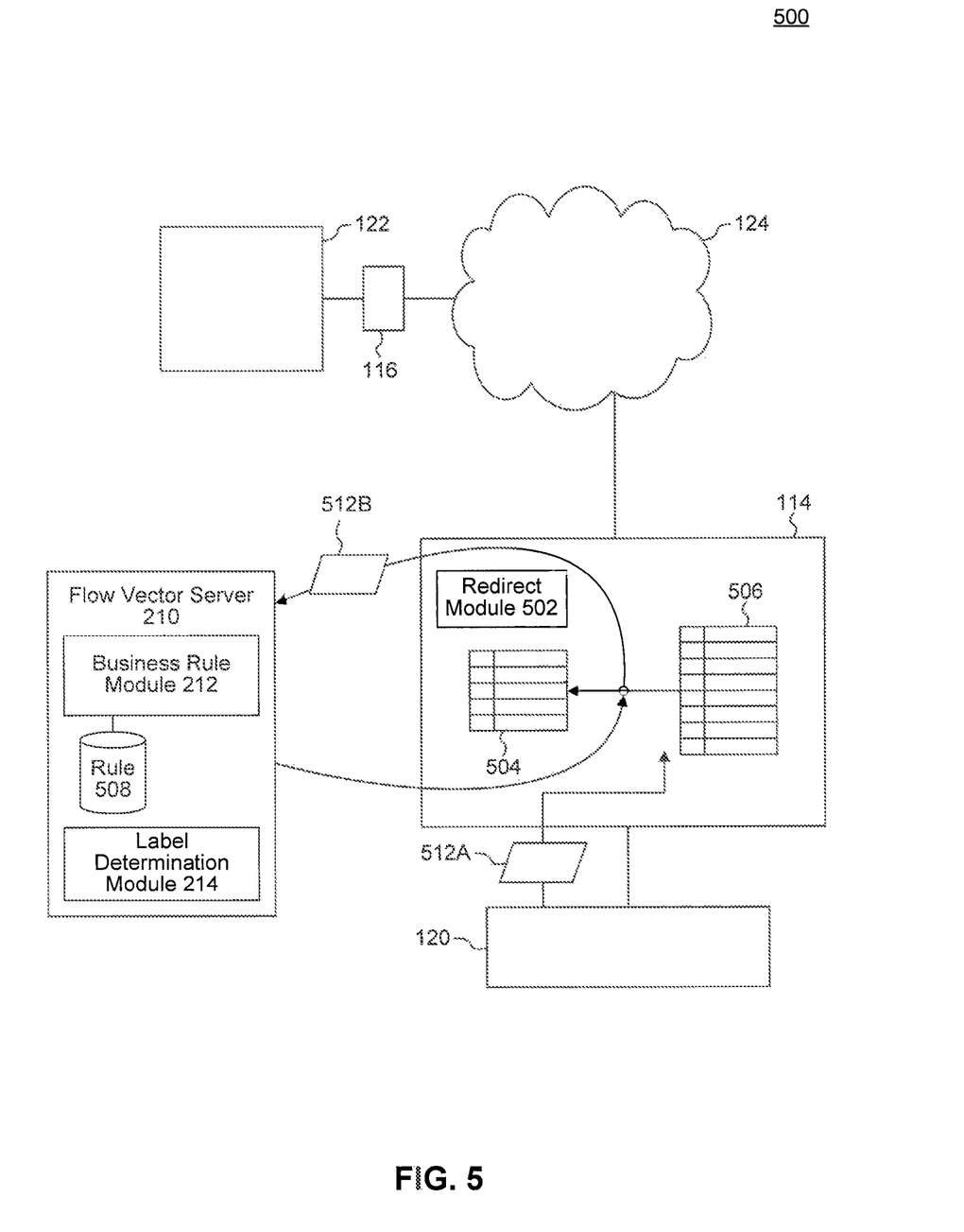
FIG. 5 illustrates an example operation where a packet is redirected to evaluate its content.
Figure 6:
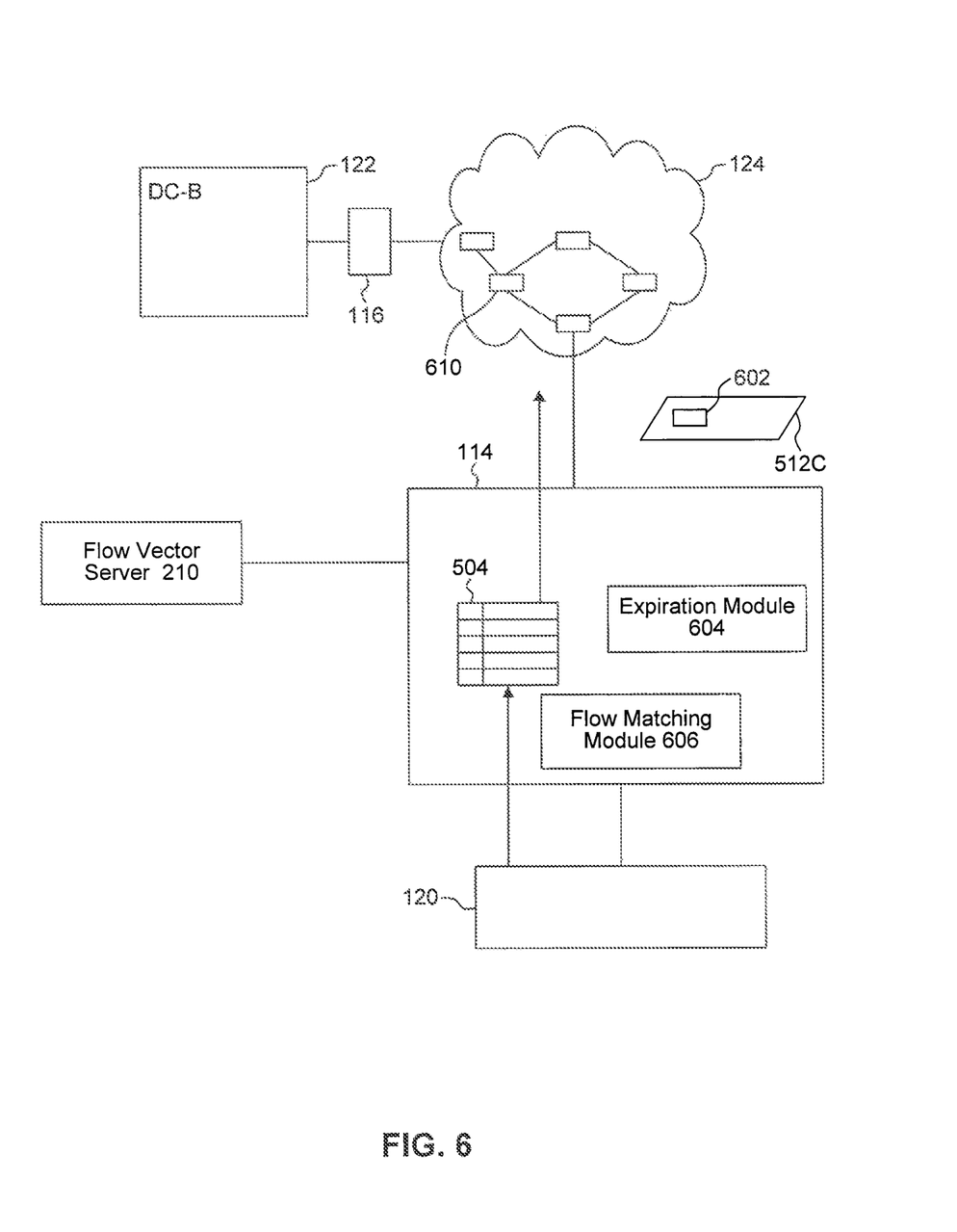
FIG. 6 illustrates an example operation where a label is attached to route the packet to its destination.

An example operation where a packet is determined to be part of a new data stream is illustrated in a diagram 500 in FIG. 5. In diagram 500, access switch 114 includes a quick lookup table 504, a slow lookup table 506, and a redirect module 502. As described above, quick lookup table 504 may map hashes of certain header information to respective output ports, and slow lookup table 506 may map network subnets to respective output ports.

Access switch 114 receives a packet 512. On receipt, redirect module 502 determines that packet 512's data stream does not have an entry in quick lookup table 504. At that point, slow lookup table 506 may determine an output port based on the destination address. This is illustrated for example at step 304 in FIG. 3. Also, redirect module 502 forwards packet 512 onto flow vector server 212 to evaluate whether packet 512 should be redirected to a place other than its destination. Reference in the drawings to packets 512A, 512B, and 512C indicates an example movement of packet 512 over time. The packet's redirection is illustrated, for example, at step 306 in FIG. 3.

At step 308, the flow vector server determines whether a special redirect rule applies to the packet based on the layer two packet contents. The flow vector server may have stored a plurality of business rules. The business rules may, for example, be defined by a user as part of a service level agreement (SLA). Based on the packet content, the flow vector server determines whether a business rule applies and selects it. To select a business rule, the flow vector server may, in an embodiment, look at layer 3 or layer 4 header information within the layer 2 packet contents. In an example for TCP/IP packets, the flow vector server may look at the IP source and destination addresses and the TCP source and destination addresses. The flow vector server may also consider the protocols used, for example TCP versus UDP. The user can set up a rule that maps packets having these properties are forwarded to a particular destination or set of destinations. Based on these properties, the flow vector server selects the appropriate rule at step 308.

In one example, the user can set up a rule stating that all traffic going to particular IP addresses (perhaps to a particular cloud service) are first redirected to a particular server, or group of servers, for analysis or processing. This may be useful, for example, in monitoring traffic or scanning for malicious content.

In another embodiment, multiple packets may be transferred to the flow vector server, and the flow vector server can do more analysis on the content to determine whether a rule applies. For example, a user can set up heuristics defining the packets that should be redirected. These heuristics may, for example, utilize pattern matching on the application data itself to identify a business rule governing redirection of the data stream.

After a business rule is determined at step 308, the flow vector server determines a destination based on the rule at step 310. In one embodiment, the rule may specify a particular destination where traffic must be redirected. In another embodiment, the rule may specify criteria for determining the destination. In an example, the rule may indicate that the traffic may be redirected to one of several servers, so long as certain service-level criteria are met. The service-level criteria may be requirements as to bandwidth, latency, jitter, location, availability, or cost. To determine the destination, the flow vector server may look at historical network usage or performance data to select the destination. Based on the historical network usage or performance data, the flow vector server may select the destination that the packet is most likely to reach while meeting the service-level criteria.

To collect historical usage or performance data, a real-time capacity server (not shown) may monitor usage or performance data from switching devices throughout the network. Typical utilization of some network resources, such as bandwidth, has a cyclical recurring pattern to it. Based upon what the real time capacity server has collected off the network devices and has learned over time, the real time capacity server may calculate an average usage of bandwidth for each five minute time interval throughout a one week time period. A skilled artisan would recognize that other intervals and periods may be used. In addition to the average, the variance may also be used to determine a confidence range of usage for each interval with a particular confidence level. The variance may include, for example, data from surrounding time slices as well. Using this data, the flow vector server may determine which destination to redirect a packet to in compliance with the business rules at step 310. Skilled artisan also recognizes that other metrics that usage may be used here, including latency, jitter, and packet loss. These metrics are also applicable to cyclic patterns similar to the usage patterns for predictive reasons.

Referring to FIG. 5, both steps 308 and 310 may be executed by business rule module 212. The business rules, including any associated service-level criteria, are stored in rules database 508. The rules may, for example, be included as part of the user's service level agreement, which may also be stored in rules database 508.

Once the destination is determined, a label for the packet is determined at step 312. The switching devices on the network may be preconfigured to recognize certain labels and route packets having those labels a particular way. The label selected at step 312 indicates to the switching devices how to route data to the determined destination. In an example, the data may be a Multiprotocol Label Switching (MPLS) label.

In one embodiment, the network may have a single pre-defined path from the access switch to each destination in the rule. In another embodiment, the network may be configured with several different alternative paths to the destination. In that embodiment, selecting the label at step 312 may involve selecting the path. To select the path, the flow vector server may utilize service level criteria as described above. Based on the historical data, the flow vector server may select a path that it determines most likely will achieve the service level criteria in the SLA.

In FIG. 5, the label may be determined in step 312 by label determination module 214.

Once the label is determined at step 312, an entry is placed into the access switch's quick lookup table. The entry instructs the access switch to attach the routing label to each packet in the data stream at step 314. Placing the entry in the table may involve sending a message from the flow vector server to the access switch with a particular routing instruction.

An example operation where a label is attached to route a packet is illustrated in a diagram 600 in FIG. 6. As shown in diagram 600, access switch 114 includes a flow matching module 606 and an expiration module 604.

When flow vector server 210 sends the message to access switch 114 with the label, flow matching module 606 attaches the label and forwards on the packet. In diagram 600, packet 512C is shown with label 602. Switching devices in network 124, such as switching device 610, are configured to recognize label 602 and know how to route it. In an example where a label corresponds to data center 122, the switching devices may route packet 512 to access switch 116 and onto data center 122.

Flow matching module 606 may recognize each subsequent packet in the data stream. To recognize the packet, flow matching module 606 may look at its contents. For example, flow matching module 606 may take a hash of the source/destination network layer addresses (such as IP addresses), the source/destination transport layer ports (such as TCP ports), and the protocol used (such as TCP/IP). Flow matching module 606 may look to see if that hash value has an entry in quick lookup table 504. The entry in quick lookup table 504 may indicate that a particular label should be attached. In this way, flow matching module 606 recognizes that a particular packet belongs to a data stream that should be redirected.

When flow matching module 606 recognizes the packet contents, it attaches the label specified in quick lookup table 504 and forwards the packet on. Recognizing the label, the downstream switches forward the packet to its new destination. Flow matching module 606 may repeat this operation for each packet received at access switch 114.

Once a particular time period has elapsed since a packet of a data stream is received, expiration module 604 removes the data stream's entry from the quick lookup table. To determine that the particular time period elapsed, expiration module 604 may, for example, record timestamps of when the most recent packets for each data stream are received. And, it may compare the recorded timestamps against the current time to determine whether any data stream entries are expired.

Figure 7:
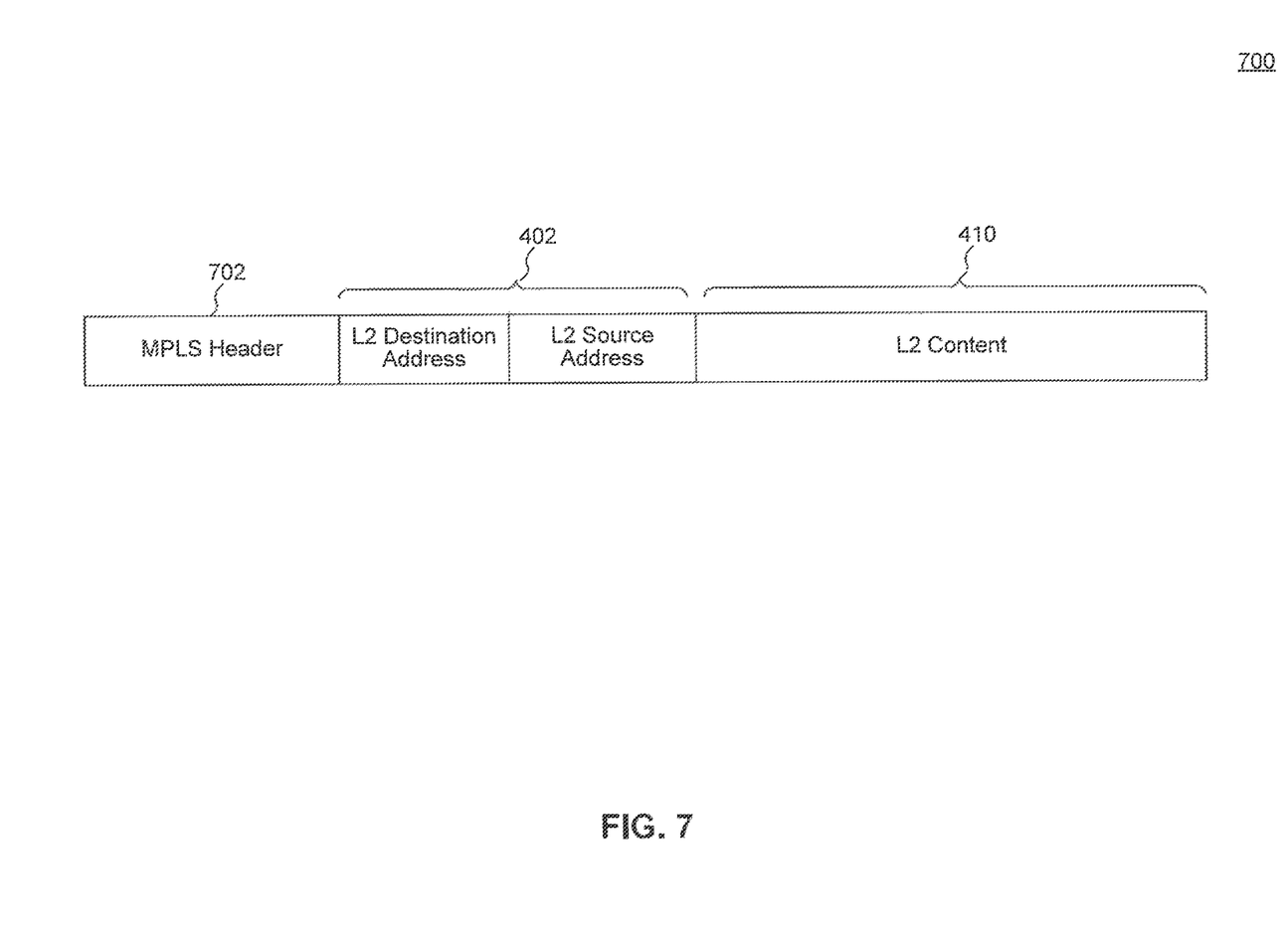
FIG. 7 illustrates the example packet with a label attached.

FIG. 7 is a diagram 700 illustrating an example packet with a label attached. Similar to the packet shown in FIG. 4, the packet shown in FIG. 7 includes a data link layer header 402 and content 410 at level two. Attached to the packet is an MPLS header 702. As described above, the MPLS header 702 includes a label that specifies to downstream switching devices how to route the packet.

Conclusion

The term "user," as used herein, may encompass both a customer of the network connectivity service, such as an employee of a business that utilizes the network connectivity service, and a network administrator of the service provider itself. Users may also be at different companies or organizations.

Rules database 508 may be any stored type of structured memory, including a persistent memory. In examples, each database may be implemented as a relational database or file system.

Each of the servers and modules may be implemented in hardware, software, firmware, or any combination thereof.

Each of the servers and modules may be implemented on the same or different computing devices. Such computing devices can include, but are not limited to, a personal computer, a mobile device such as a mobile phone, a workstation, an embedded system, a game console, a television, a set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for routing traffic through a network including a plurality of interconnected switching devices, comprising:
   (a) receiving a packet that includes a header and contents, the packet in a data stream;
   (b) determining whether the packet's data stream does not have an entry in a quick lookup table of an access switching device to determine whether the packet is in a new data stream, wherein the quick lookup table maps data streams to respective outputs of the access switching device and is separate from a forwarding table that maps groups of destination addresses to respective outputs;
   (c) determining that a rule in a plurality of rules correlates to the contents of the packet;
   (d) determining a destination for the packet based on the rule;
   (e) determining a label to attach to the packet, the label indicating to the plurality of interconnected switching devices how to route data to the destination; and
   (f) attaching the label to respective packets in the new data stream to direct the data stream to the destination determined based on the rule and the contents.

2. The method of claim 1, wherein the packet is a layer two, data link layer packet, the header is a layer two, data link layer header, and the contents are layer two, data link layer contents.

3. The method of claim 2, wherein the contents include a header of a layer three, network layer packet, and
   wherein the determining (c) comprises determining the rule based on the header of the layer three, network layer packet.

4. The method of claim 3, wherein the contents are at least a portion of the layer three, network layer packet and the portion of the layer three, network layer packet includes at least a portion of a layer four, transport layer packet,
   wherein the determining (c) further comprises determining the rule based on protocols of the network layer packet and the transport layer packet, source and destination addresses in the portion of the network layer packet, and source and destination ports in the portion of the transport layer packet.

5. The method of claim 1, further comprising:
   (g) receiving an additional packet from the new data stream, the additional packet also including a header and contents, and
   wherein the determining (c) comprises selecting the rule from the plurality of rules based on the contents of both the packet received in (a) and the additional packet received in (g).

6. The method of claim 1, further comprising:
   (g) inserting a new entry into the quick lookup table, the new entry correlating the contents with an instruction to attach the label identifying the destination;
   (h) receiving, at the access switching device, an additional packet;
   (i) correlating contents of the additional packet with the new entry in the quick lookup table to determine whether the additional packet is part of the new data stream; and
   (j) when the additional packet is determined to be part of the new data stream, attaching the label to the additional packet to route the additional packet to the destination.

7. The method of claim 6, further comprising:
   (k) determining that a particular time period has elapsed since the packet has been determined to be part of the new data stream in (b);
   (l) until particular time period is determined to have elapsed in (k), repeating steps (h)-(j);
   (m) when the particular time period is determined to have elapsed in (k), removing the entry from the quick lookup table.

8. The method of claim 1, wherein the rule associates the contents of the packet to particular bandwidth and latency requirements defined in a service level agreement.

9. The method of claim 1, wherein the determining (d) comprises selecting the destination from a plurality of destinations based on historical network usage or performance such that the particular bandwidth and latency requirements are forecasted to be met.

10. A system for routing traffic through a network including a plurality of interconnected switching devices, comprising:
an access switching device;
a forwarding table that maps groups of destination addresses to respective outputs of the access switching device;
a quick lookup table of the access switching device, the quick lookup table mapping data streams to respective outputs of the access switching device and being separate from the forwarding table;
a redirect module that (i) receives a packet, in a data stream, that includes a header and contents, (ii) determines that the packet's data stream does not have an entry in the quick lookup table to determine whether the packet is part of the new data stream, and (iii) determines that the packet is in the new data stream;
a business rule module that determines that a rule in a plurality of rules correlates to the contents of the packet and determines a destination for the packet based on the rule; and
a label determination module that determines a label to attach to the packet, the label indicating to the plurality of interconnected switching devices how to route data to the destination, wherein the label is attached to respective packets in the new data stream to direct the new data stream to the destination determined based on the rule and the contents.

11. The system of claim 10, wherein the packet is a layer two, data link layer packet, the header is a layer two, data link layer header, and the contents are layer two, data link layer contents.

12. The system of claim 11, wherein the contents include a header of a layer three, network layer packet, and
wherein the business rule module determines the rule based on the header of the layer three, network layer packet.

13. The system of claim 12, wherein the contents are at least a portion of the layer three, network layer packet and the portion of the layer three, network layer packet includes at least a portion of a layer four, transport layer packet,
wherein the business rule module determines the rule based on protocols of the network layer packet and the transport layer packet, source and destination addresses in the portion of network layer packet, and source and destination ports in the portion of the transport layer packet.

14. The system of claim 13, further comprising:
wherein the redirect module receives an additional packet from the new data stream, the additional packet also including a header and contents, and
wherein the business rule module selects the rule from the plurality of rules based on the contents of both the packet and the additional packet.

15. The system of claim 13, wherein the label determination module sends a message to insert a new entry into the quick lookup table, the new entry correlating the contents with an instruction to attach the label identifying the destination,
wherein the access switching device receives an additional packet,
wherein the redirect module correlates contents of the additional packet with the new entry in the quick lookup table to determine whether the additional packet is part of the new data stream, and
wherein the label is attached to the additional packet to route the additional packet to the destination when the additional packet is determined to be part of the new data stream.

16. The system of claim 15, further comprising:
an expiration module that determines that a particular time period has elapsed since the packet has been determined to be part of the new data stream and, when the particular time period is determined to have elapsed, removes the entry from the quick lookup table.

17. The system of claim 10, wherein the rule associates the contents of the packet to particular bandwidth and latency requirements defined in a service level agreement.

18. The system of claim 17, wherein the business rule module selects the destination from a plurality of destinations based on historical network usage such that the particular bandwidth and latency requirements are forecasted to be met.

19. A program storage device tangibly embodying a program of instructions executable by at least one machine to perform a method for routing traffic through a network including a plurality of interconnected switching devices, said method comprising:
(a) receiving a packet that includes a header and contents, the packet in a data stream;
(b) determining whether the packet's data stream does not have an entry in a quick lookup table of an access switching device to determine whether the packet is in a new data stream, wherein the quick lookup table maps data streams to respective outputs of the access switching device and is separate from a forwarding table that maps groups of destination addresses to respective outputs;
(c) determining that a rule in a plurality of rules correlates to the contents of the packet;
(d) determining a destination for the packet based on the rule;
(e) determining a label to attach to the packet, the label indicating to the plurality of interconnected switching devices how to route data to the destination; and
(f) attaching the label to respective packets in the new data stream to direct the data stream to the destination determined based on the rule and the contents.

20. The program storage device of claim 19, wherein the packet is a layer two, data link layer packet, the header is a layer two, data link layer header, and the contents are layer two, data link layer contents and wherein the contents include application layer contents, and wherein the determining (c) comprises determining the rule based on the application layer contents.

* * * * *